Jan. 26, 1960

L. C. TWYFORD, JR 2,922,232

SELF OPERATING QUIZZING AND SCORING DEVICE

Filed April 11, 1958

INVENTOR.
LORAN C. TWYFORD, JR.
BY
Lawrence S. Epstein
ATTORNEYS

Jan. 26, 1960        L. C. TWYFORD, JR        2,922,232
SELF OPERATING QUIZZING AND SCORING DEVICE

Filed April 11, 1958                      3 Sheets-Sheet 2

INVENTOR.
LORAN C. TWYFORD, JR.
BY

Lawrence S. Epstein
ATTORNEYS

Jan. 26, 1960     L. C. TWYFORD, JR     2,922,232
SELF OPERATING QUIZZING AND SCORING DEVICE

Filed April 11, 1958     3 Sheets-Sheet 3

INVENTOR.
LORAN C. TWYFORD, Jr.
BY
Lawrence S. Epstein
ATTORNEYS

United States Patent Office 2,922,232
Patented Jan. 26, 1960

2,922,232

SELF OPERATING QUIZZING AND SCORING DEVICE

Loran C. Twyford, Jr., Lansing, Mich., assignor to the United States of America as represented by the Secretary of the Navy Application April 11, 1958, Serial No. 728,021

4 Claims. (Cl. 35—9)

(Granted under Title 35, U.S. Code (1952), sec. 266)

The invention described herein may be manufactured and used by or for governmental purposes without the payment of any royalties thereon or therefor.

The present invention relates generally to devices wherein information is given in game-like manner to an operator and relates more particularly to self-operated quizzing and scoring devices wherein a student is encouraged to quiz himself by operating a game-like tester.

Various training devices have heretofore been made available for self-quizzing wherein elaborate electrical circuits are utilized. Also available are devices wherein tapes and films having questions and corresponding answers stored thereon are utilized. These devices, besides having the obvious disadvantages of complexity of structure and expensiveness, also have the disadvantage of being viewable and operable by only one operator. The instant invention overcomes the aforesaid disadvantages by being mechanically easy to construct and is so designed that more than one person may operate the device as, e.g., in competition.

The instant invention is a device wherein push-buttons are provided which correspond to possible answers to display multiple choice type questions. When an "incorrect" button is pushed, a red marker is displayed indicating "wrong." When a "correct" button is pushed, a green marker is displayed indicating "correct."

A principal object of the invention is to produce a mechanically simple game-like testing device.

Another object of the invention is to provide a game-like tester made up of a multiplicity of test units.

Still another object is to provide a tester which may be operated by more than one person as, e.g., in competition.

It is a further object to provide a testing device that can be returned to the start position by the movement of a single element.

It is still another object to provide a device capable of being utilized in the classroom to teach and train students.

And it is yet another object to provide a device which will immediately indicate to the operator or student whether the answer he has given is correct.

It is another object to provide a testing or training device which will allow the operator thereof to determine the final score directly and by himself, without the necessity of utilizing a correct answer key.

It is a further object to utilize a multiple choice type of quiz device wherein the number of choices may be varied by the total number of answer buttons and answer indicating openings provided.

Other objects and many of the attendant advantages of this invention will be readily appreciated as the same becomes better understood by reference to the following detailed description when considered in connection with the accompanying drawings wherein.

Figure 1:
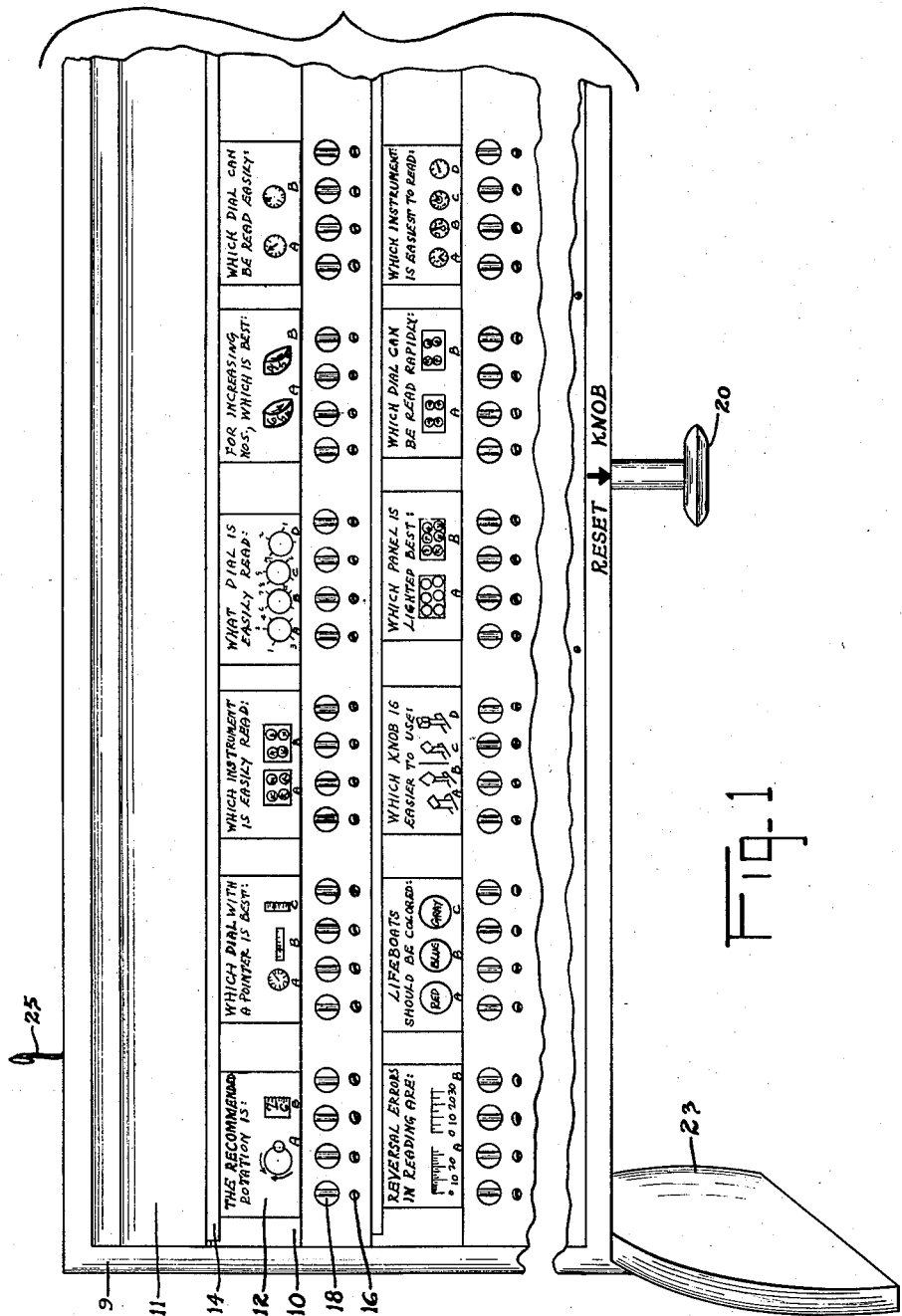
Fig. 1 is a front elevational view of a preferred embodiment of a tester.
Figure 2:
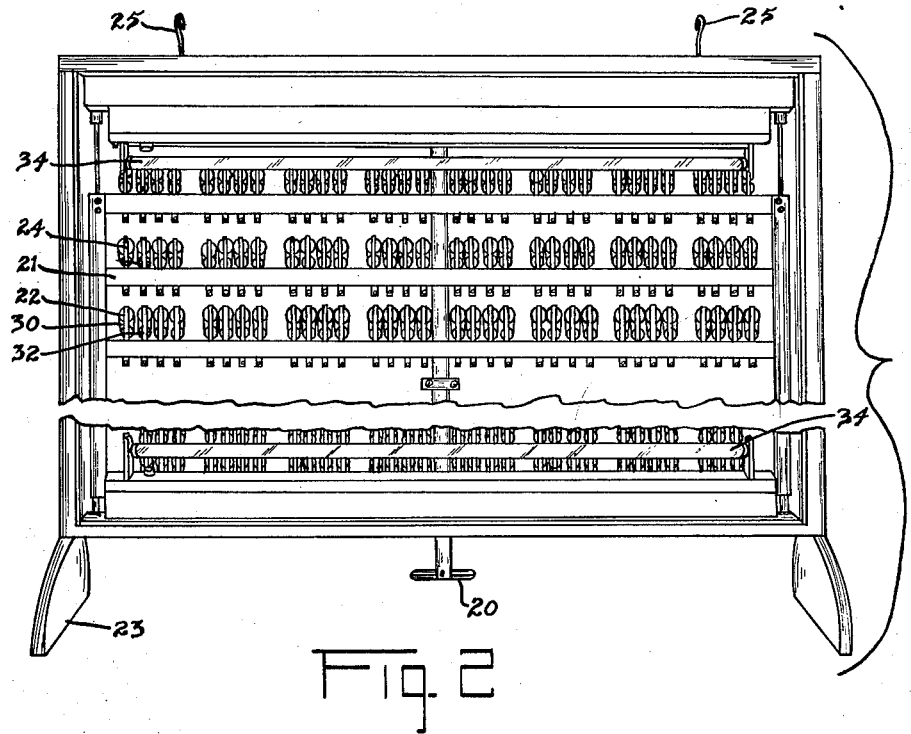
Fig. 2 is a rear view of Fig. 1.
Figure 3:
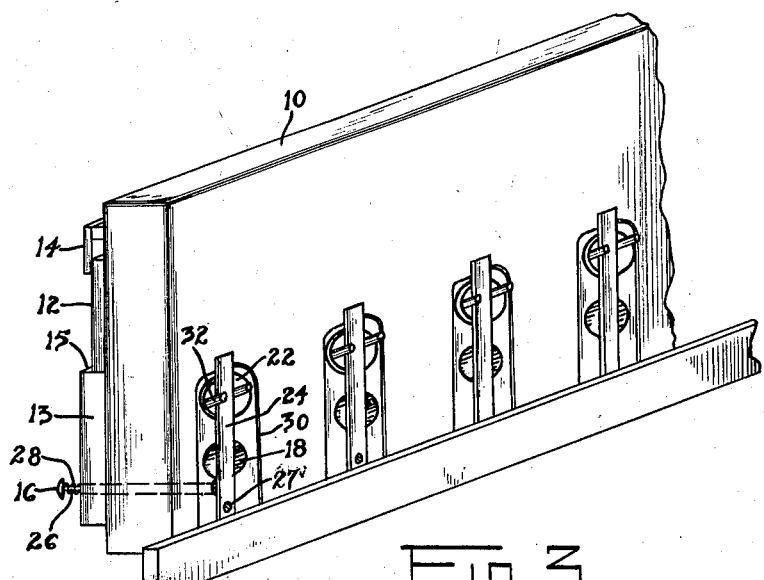
Fig. 3 is a perspective rear view of a typical test unit found on the tester.

Referring to Figs. 1 to 3, one form of the invention incorporating the principles of operation of the invention is illustrated. A panel 11 is mounted within a frame 9, as is illustrated in Fig. 1. Panel 11 is made up of a battery of individual test units 10 integrally combined together to form the unitary rate device. Each test unit 10 incorporates the principles of the invention. Mounted on the panel 11 is a multiplicity of question cards 12 of the multiple choice type.

The question cards 12 are frictionally mounted or retained between the horizontal strips 14 and the supporting ledges or shoulders 15 (see Fig. 3). As is readily apparent from Fig. 1, the strips and shoulders have been combined to form a unitary structure for ease of manufacture while six cards 12 are illustrated in line of the device; the total number may be varied as desired. The main panel 11 also is provided with a plurality of answer buttons 16 thereon and answer-indicator openings 18 positioned between the shoulders 15 and the buttons 16. Each button 16 is preferably located immediately beneath an opening 18 for easy correlation of the button pushed and the reply. The correlated answer buttons 16 and answer indicator openings 18 are shown as being in groups of four and each group is shown as being located directly below a single question card. Thus correlation is attained between each question card and each answer group. A clearing handle 20 to be described in greater detail shortly, is provided for clearing all units simultaneously and is preferably operable from the front of the rater.

A support member 23 is secured to the frame 9 for mounting the device on a table or the like. Hooks 25 are provided for use when the device is to be mounted on a wall.

Referring to Fig. 2, discs 22, one for each answer indicator opening 18, are slidably retained within disc channels 30. The channels 30 are cut into the rear of the main panel 11. While any shape and color of disc may be utilized, a circular disc is preferred because of the minimum friction areas encountered as it travels down the channel. It is also preferred to use transparent or translucent discs. In addition, each disc is in a specific color, whereby a green disc could symbolize the correct answer and a red disc denotes an erroneous answer. Positioned over each channel 30 is a resilient strap 24 which normally serves to hold the disc at its uppermost position. Each disc is provided with tits 32 which engage the clearing bar 21 when the bar moves upward. One clearing bar 21 is preferably provided for each row of test units 10 and each bar is preferably mechanically fixed to the clearing handle 20 at approximately its mid-point, thus providing simultaneous clearing of all units. Lamps 34 are also provided for illuminating the colored discs, thus creating a pleasing presentation of the answer.

In order to more clearly understand the details of the rater's operation, reference is made to the enlarged illustration of a test unit shown in Fig. 3. The question card 12 is held in place by the card holder 14 and is supported by the card support 13. The answer button 16 engages the resilient strap 24 by means of the button shaft 26. The strap 24 is fixed to the frame 10 at 27.

When the button 16 is actuated, the shaft 26 moves forward, thereby releasing the tension of the strap 24. This allows the disc 22 to fall and cover the answer indicator opening 18. The answer buttons 16 may be spring loaded by means of the springs 28 to insure return of the buttons 16 to their normal position. The free ends of the straps 24, which serve to hold the discs 22 above the answer indicator opening 18, are positioned between the disc tits 32 when the discs 22 move up and down in the disc channels 30. When the quiz board is to be cleared of answers, the clearing bar 21 is moved upwardly and engages the fallen disc tits 32. Continual upward movement of the clearing bar carries all discs 22 upward in their respective channels 30 until they are returned to their original positions. The discs 22 are then frictionally held in their channels 30 above the openings 18 and against the rear of the frame 10 by the straps 24. The straps 24 in conjunction with the tits 32 also restrain marker motion to above and over the answer-indicator opening 18.

In operation, a person wishing to use the rater would first read the multiple choice type question imprinted on the question card 12. He would then select an answer, and would then push one of the answer buttons 16 corresponding with his chosen answer. The button 16 when pushed exerts a rearward force by means of rod 30 on the strap 24. The strap 24 is thus separated slightly from the disc 22, thereby releasing the frictional force restraining the disc 22 from falling. The disc 22 falls and covers the opening 18 which is viewable from the front side of the rater. The color of this fallen disc, as stated above, indicates to the operator whether he has answered the question correctly or not, and scores himself accordingly. He does not need to wait for later evaluation of his score.

Figure 4:
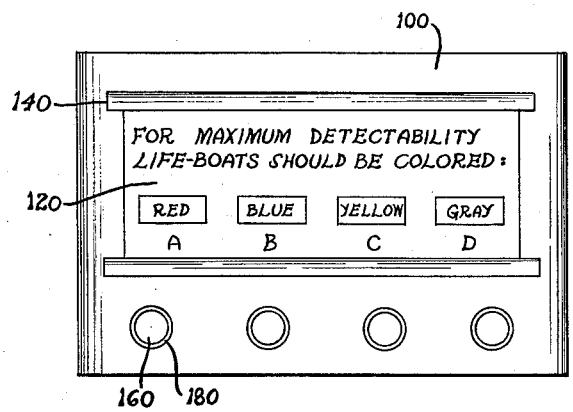
Fig. 4 is a front view of another form of the invention.
Figures 5, 6:
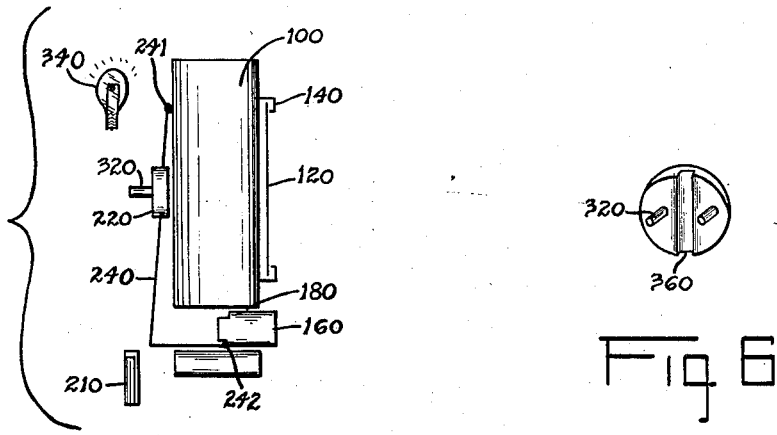
Fig. 5 is a side view of Fig. 4.
Fig. 6 is a rear view of a disc used with the embodiment of Fig. 5.

Figs. 4, 5 and 6 refer to another form of the invention which incorporates the operational principles described above, but which uses a modified structure for each of the test units. As is illustrated, the unit 100 is provided with a multiplicity of answer-indicator openings 180, in this case four, in which there is slidably retained a transparent or translucent answer button 160. A question card 120 having imprinted on it a multiple choice type question is mounted on the test unit 100 by any suitable means 140. Fixed to each answer button 16 at 242 is a strap 240 which extends rearwardly and then bends upwardly and is then fixed at 241 to the rear of the unit. The discs 220 (Fig. 6) serving as marker means are provided with guide channels 360 adapted to retain the straps 240 for sliding movement therein. In its preferred form, the discs 220 are further provided with tits 320. The discs 220 are held above the answer-indicator openings and against the rear of the unit 100 by the tension of the straps 240. When an answer button 160 is pushed, the strap tension is removed and the disc gravity falls to cover the answer indicator opening 180. Inasmuch as the answer button permits light to pass, it will convey the "answer indication" of the fallen disc. Clearing means 210 is provided to return the fallen disc to its original position. Clearing means 210 is preferably a bar operable from the front of the unit. When clearing, the bar 210 is moved upward and engages the tits 320 thus carrying the discs upward. The discs are guided vertically upward by means of straps 240 and become wedged between the upper portion of rear of the unit 100 and the strap 240. Friction between the upper part of the disc and the rear of the unit, sufficient to overcome the force of gravity and prevent the disc from falling, is produced by wedging as tightly as necessary, the disc in the apex of the area bounded by the strap 240 and rear of the unit 100. Preferably, clearing bar 210 should be limited in its upward movement in order that the disc doesn't become too tightly wedged in and also to prevent the disc from rotating about a fulcrum located at the upper portion of the disc due to the torque being applied to the tits 320 by the bar 210. However, even if the clearing bar is not limited in its movement, the device will still operate properly and will merely require a harder push on the answer button 160.

Obviously many modifications and variations of the present invention are possible in the light of the above teachings. It is therefore to be understood that within the scope of the appended claims the invention may be practiced otherwise than as specifically described.

What I claim is:

1. A training device comprising a panel having a front and rear side and provided with a multiplicity of answer-indicator openings therein, a question card holder fixed to said front side for retaining question cards having multiple choice type questions thereon, a multiplicity of tension means fixed to said rear side, each straddling a single answer-indicator opening, transparent colored marker means frictionally held against said rear side above each of said answer-indicator openings by said tension means, said marker colors being indicative of correctness, tit means fixed to said marker means, a multiplicity of answer buttons situated on said front side, each mechanically operable with a single tension means to release said markers, thereby causing said marker means to gravity fall and cover said answer-indicator opening, clearing means operable from said front side slidably retained on said rear side, said means engaging the falling marker tit means when said clearing means is moved upward, thereby removing said marker means from said answer indicator openings, and a light shining through said colored marker to an operator on said front side, wherein said colored markers are provided with guide channels, said answer buttons being slidably retained in said answer indicator openings, and said tension means are straps fixed at one end to said rear side and coupled at their other end to said answer buttons, said straps riding in said channels when said buttons are pushed and when the device is cleared.

2. A training device wherein several questions may be answered by one or more persons operating said device singly or simultaneously, said device comprising a multiplicity of test units, each unit having a front and rear side and provided with a multiplicity of answer-indicator openings therein, said units each comprising a question card holder fixed to said front side for retaining question cards having multiple choice-type questions thereon, a multiplicity of tension means fixed to said rear side, each straddling single-answer-indicator opening, transparent colored marker means frictionally held against said rear side above each of said answer-indicator openings by said tension means, said marker colors being indicative of correctness, tit means fixed to said marker means, a multiplicity of answer buttons situated on said front side, each mechanically operable with a single tension means to release said marker, thereby causing said marker means to gravity fall and cover said answer-indicator opening, clearing means operable from said front side and slidably retained on said rear side, said means engaging the fallen marker tit means when said clearing means is moved upward, thereby removing said marker means from said answer-indicator openings, said device being further provided with a source of light operable with all test units for shining through said marker means to an operator on said front side and wherein all of said clearing means are ganged together thereby providing simultaneous clearing of all test units, wherein said answer buttons are provided with guide channels and are slidably retained in said answer indicator openings, said tension means are straps fixed at one end to said rear side and coupled at their other end to said answer buttons, said straps riding in said channels when said buttons are pushed and when said device is cleared.

3. A training device comprising a panel having a front and rear side and provided with a multiplicity of answer-indicator openings therein, a question card holder fixed to said front side for retaining question cards having multiple-choice type questions thereon, a multiplicity of tension means fixed to said rear side, each straddling a single answer-indicator opening, indicator marker means frictionally held against said rear side above each of said answer-indicator openings by said tension means, said marker means being provided with indications of correctness, tit means fixed to said marker means, a multiplicity of answer buttons situated on said front side, each mechanically operable with a single tension means to release said markers, thereby causing said marker means to gravity fall and cover said answer-indicator opening, marker motion restraining means fixed to said rear side restricting the motion to above and over said answer-indicator openings, and clearing means operable from said front side and slidably retained on said rear side, said clearing means engaging fallen marker tits when said clearing means is moved upward, thereby removing said marker means from said answer-indicator openings, said marker means being transparent and colored, said colors indicating correctness.

4. A training device wherein several questions may be answered by one or more persons operating said device singly or simultaneously, said device comprising a multiplicity of test units, each unit having a front and rear side and provided with a multiplicity of answer indicator openings therein, said units each comprising a question card holder fixed to said front side for retaining question cards having multiple-choice type questions thereon, a multiplicity of tension means fixed to said rear side, each straddling a single answer-indicator opening, indicator marker means frictionally held against said rear side above each of said answer-indicator openings by said tension means, said marker means being provided with indications of correctness, tit means fixed to said marker means, a multiplicity of answer buttons situated on said front side, each mechanically operable with a single tension means to release said markers, thereby causing said marker means to gravity fall and cover said answer-indicator opening, marker motion restraining means fixed to said rear side restricting the motion to above and over said answer-indicator openings, and clearing means operable from said front side and slidably retained on said rear side, said clearing means engaging fallen marker tits when said clearing means is moved upward, thereby removing said marker means from said answer-indicator openings, said clearing means of all units being ganged together thereby providing simultaneous clearing of all test units, said markers being transparent and colored, said colors indicating correctness.

References Cited in the file of this patent

UNITED STATES PATENTS

| | | |
|---|---|---|
| 1,025,226 | Wood | May 7, 1912 |
| 1,718,740 | Jones | June 25, 1929 |
| 1,749,226 | Pressey | Mar. 4, 1930 |
| 2,148,259 | Cisin | Feb. 21, 1939 |
| 2,311,217 | Emmert | Feb. 16, 1943 |
| 2,516,997 | Kellinger | Aug. 1, 1950 |
| 2,535,973 | Voges | Dec. 26, 1950 |
| 2,585,099 | Emmert | Feb. 12, 1952 |
| 2,654,163 | Reynolds | Oct. 6, 1953 |